US005602438A

United States Patent [19]

Reisnecker et al.

[11] Patent Number: 5,602,438

[45] Date of Patent: Feb. 11, 1997

[54] ROLL COMMUTATOR FOR ELECTRIC MOTORS AND DYNAMOS, AND METHOD OF MANUFACTURING IT

[75] Inventors: Ludwig Reisnecker, Ludwigsburg-Pflugfelden; Martin Schwertle, Schwieberdingen; Winfried Brettmann, Bad Salzdetfurth; Friedrich Behrens, Diekholzen; Hans Deierling, Hildesheim; Peter Franz, Diekholzen; Siegfried Hauptmann, Hildesheim; Claus Pollack, Bettrum; Stefan Ossenkopp, Hildesheim, all of Germany

[73] Assignee: Robert Bosch GmbH, Stuttgart, Germany

[21] Appl. No.: 547,631

[22] Filed: Oct. 24, 1995

Related U.S. Application Data

[63] Continuation of Ser. No. 108,636, Aug. 25, 1993, abandoned.

[30] Foreign Application Priority Data

Feb. 28, 1991 [DE] Germany .......................... 41 06 307.4

[51] Int. Cl.[6] .......................... H01R 43/06; H02K 13/00

[52] U.S. Cl. .......................... 310/233; 310/235; 310/236; 310/42; 29/597

[58] Field of Search .......................... 310/42, 233, 235, 310/236; 29/597

[56] References Cited

U.S. PATENT DOCUMENTS

| | | | |
|---|---|---|---|
| 1,994,062 | 3/1935 | Bonanno | 310/235 |
| 2,451,500 | 10/1948 | LeGreid | 310/235 |
| 2,477,455 | 7/1949 | Hinchliff | 310/236 |
| 3,140,414 | 7/1964 | Skjodt et al. | 310/235 |
| 5,204,574 | 4/1993 | Kanno et al. | 310/233 |
| 5,353,492 | 10/1994 | Potocnik et al. | 29/597 |

FOREIGN PATENT DOCUMENTS

| | | | |
|---|---|---|---|
| 1117212 | 11/1961 | Germany | 310/235 |
| 1218053 | 6/1966 | Germany . | |
| 4137400 | 5/1993 | Germany | 310/233 |
| 259271 | 6/1964 | Netherlands | 310/233 |
| 1161325 | 8/1969 | United Kingdom . | |

*Primary Examiner*—Clayton E. LaBalle
*Attorney, Agent, or Firm*—Michael J. Striker

[57] ABSTRACT

A roll commutator for electric motors has a plurality of bars adjacent to one another and produced from a continuous metal section. The metal section already has projections on one of its sides before the production of the bars, which projections serve as anchoring claws after rolling up the line portions produced from the metal section. Additional tools and processing steps are not needed since it is not necessary to process the claws when manufacturing the roll commutator.

7 Claims, 3 Drawing Sheets

ROLL COMMUTATOR FOR ELECTRIC MOTORS AND DYNAMOS, AND METHOD OF MANUFACTURING IT

This is a continuation of application Ser. No. 08/108,636 filed Aug. 25, 1993 now abandoned.

BACKGROUND OF THE INVENTION

The present invention relates to a roll commutator for electric motors and dynamos, as well as to a method of its manufacture.

In a known roll commutator of the type in question (DE-AS 12 18 053), the bars are produced from a metal section in that grooves are stamped in transversely to the longitudinal direction of the section. To anchor the material used for injecting around the bars, anchoring claws are worked out of these bars by rough-turning. These anchoring claws are formed on the surface of the metal section subsequently forming the inside of the commutator. Thus, a separate production process is required for working out the anchoring claws from the metal section.

SUMMARY OF THE INVENTION

Accordingly, it is an object of the present invention to provide a roll commutator for electric motors and dynamos, and a method of manufacturing the same, which avoids the disadvantages of the prior art.

In keeping with these objects and with others which will become apparent hereinafter, one feature of the present invention resides, briefly stated, in a roll commutator in which the metal section for producing bars already has projections on one of its sides before the production of the bars, and the projections serve as anchoring claws after rolling up of the machined metal section. When the roll commutator is designed in accordance with the present invention, it has the advantage over the prior art that it is simple and accordingly inexpensive to manufacture. Bending or rough-turning processes for working out the claws are dispensed with and accordingly the machining steps in the production of the roll commutator are reduced. Moreover, a group of tools requiring additional maintenance labor can be done away with in the manufacture of the commutator.

In a particularly preferred embodiment example of the roll commutator, the metal section has a substantially L-shaped base body. The longer arm of this base body has projections on its surface located in the inside in the finished state of the commutator. These projections preferably have a V-shaped root region. The ends of these projections are directed outward in opposite directions substantially parallel to the longer arm of the base body. The metal section thus has a simple cross section which allows the metal section to be manufactured in an inexpensive extruding process. It has proven particularly advantageous that the anchoring claws securely hold the insulating mass and also enable the attachment of armor rings.

Also, the L-shaped metal section for the roll commutator according to the invention enables a very simple and reliable manufacturing process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
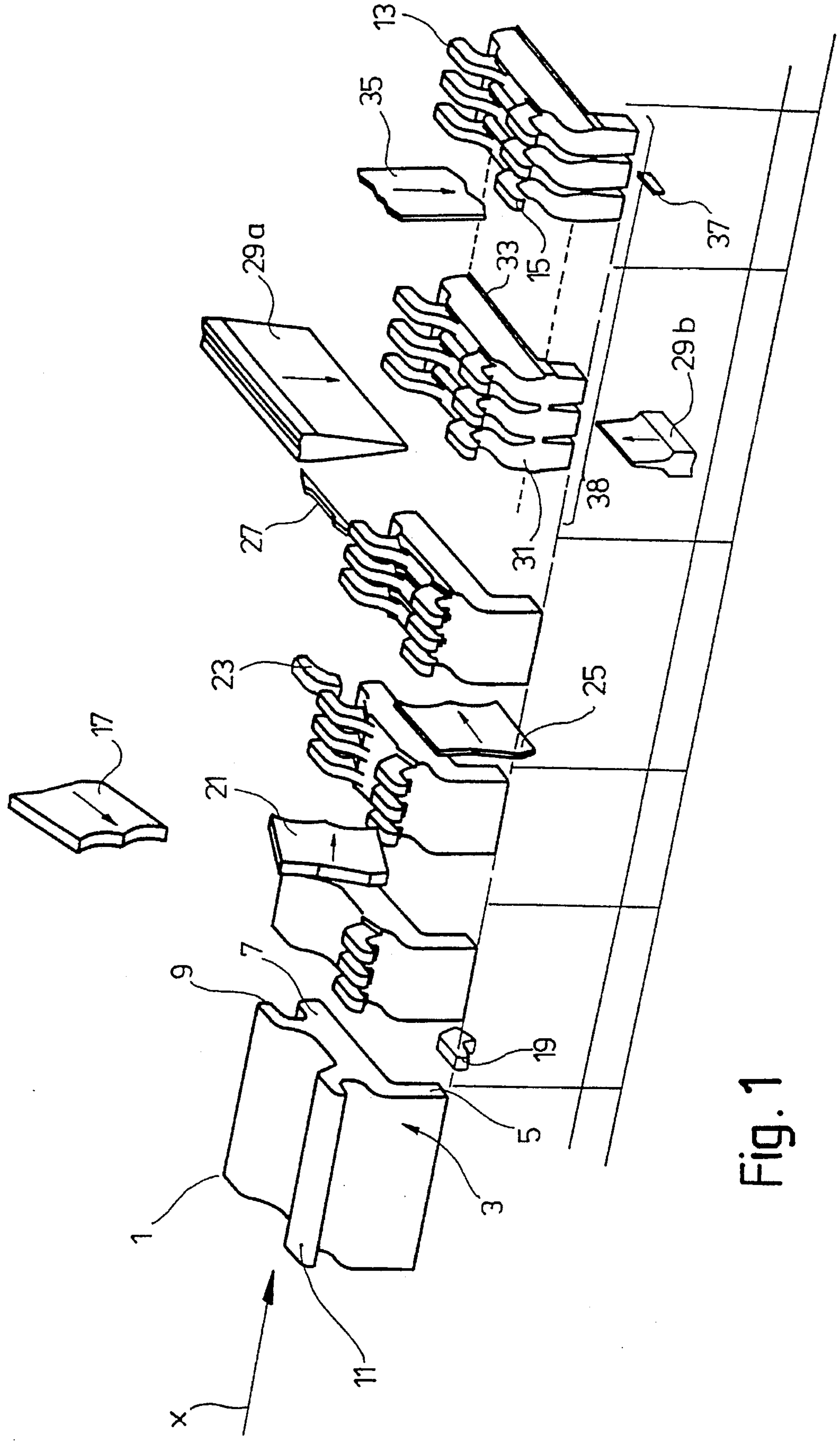
FIG. 1 shows a metal section used for the manufacture of a roll commutator in various machining or processing stages.

The individual machining or processing steps in the manufacture of a roll commutator from a metal section 1 are shown in FIG. 1.

The metal section 1 has a substantially L-shaped base body 3 whose shorter arm 5 according to FIG. 1 is directed downward, while its longer arm 7 extends substantially horizontally. Two wing-like, outwardly directed projections 9 and 11 from which the anchoring claws 13 and 15 are produced proceed from the surface of the longer arm. For the purpose of producing these anchoring claws 13 and 15, segments 19 are cut out of the projection 11 and discarded with the aid of a first cutting tool 17 in a first processing step referred to as step 1. The removal of these segments 19 provides sufficient spacing between the adjacent anchoring claws 15 for further processing.

The direction of movement of the metal section 1 through a machining station for the manufacture of individual line portions which are constructed to form a roll commutator is indicated by an arrow.

In step 2 of the process, corresponding segments 23 are cut out of the projection 9 with a second cutting tool 21 and discarded for the spacing between the adjacent anchoring claws 13. This second cutting tool 21 is only suggested in the drawing, its movement direction being designated by an arrow.

In the third machining step, a third cutting tool 25 moving in the direction of the arrow parallel to the longer arm 7 cuts out notches between the remaining anchoring claws 13 and 15 producing waste segments 27.

In the next processing step, referred to as step 4, the areas of the base body 3 located between the anchoring claws 13 and 15 are upset by suitable stamping dies **29*a* and 29*b* which work in opposite directions and are shown here only in outline, their movement direction being indicated by arrows, so as to form bars 31 which are associated with the anchoring claws 13 and 15 and are connected with one another by slender webs or cross-pieces 33. The cross-pieces extend directly at the underside of the base body 3** which forms the outside of the subsequent roll commutator as discussed in the following.

Finally, in an additional machining step, referred to as step 5, the cross-pieces 33 are cut out in the region in which the shorter arms 5 meet the base body 3. For this purpose, a fourth cutting tool 35 is introduced approximately in the direction of the longitudinal dimension of the shorter arms 5, i.e. the direction of the arrow, into the intermediate space between two bars 31 so that the cross-pieces 33 in the region of the shorter arms 5 are cut out, resulting in segments 37 which are discarded.

To produce the line portions 38 required for a roll commutator from the metal section 1 it is possible to separate these line portions from the metal section 1 before step 1 or after step 5. In FIG. 1, it is assumed that the individual line portions 38 have been severed before the first step.

Figure 2:
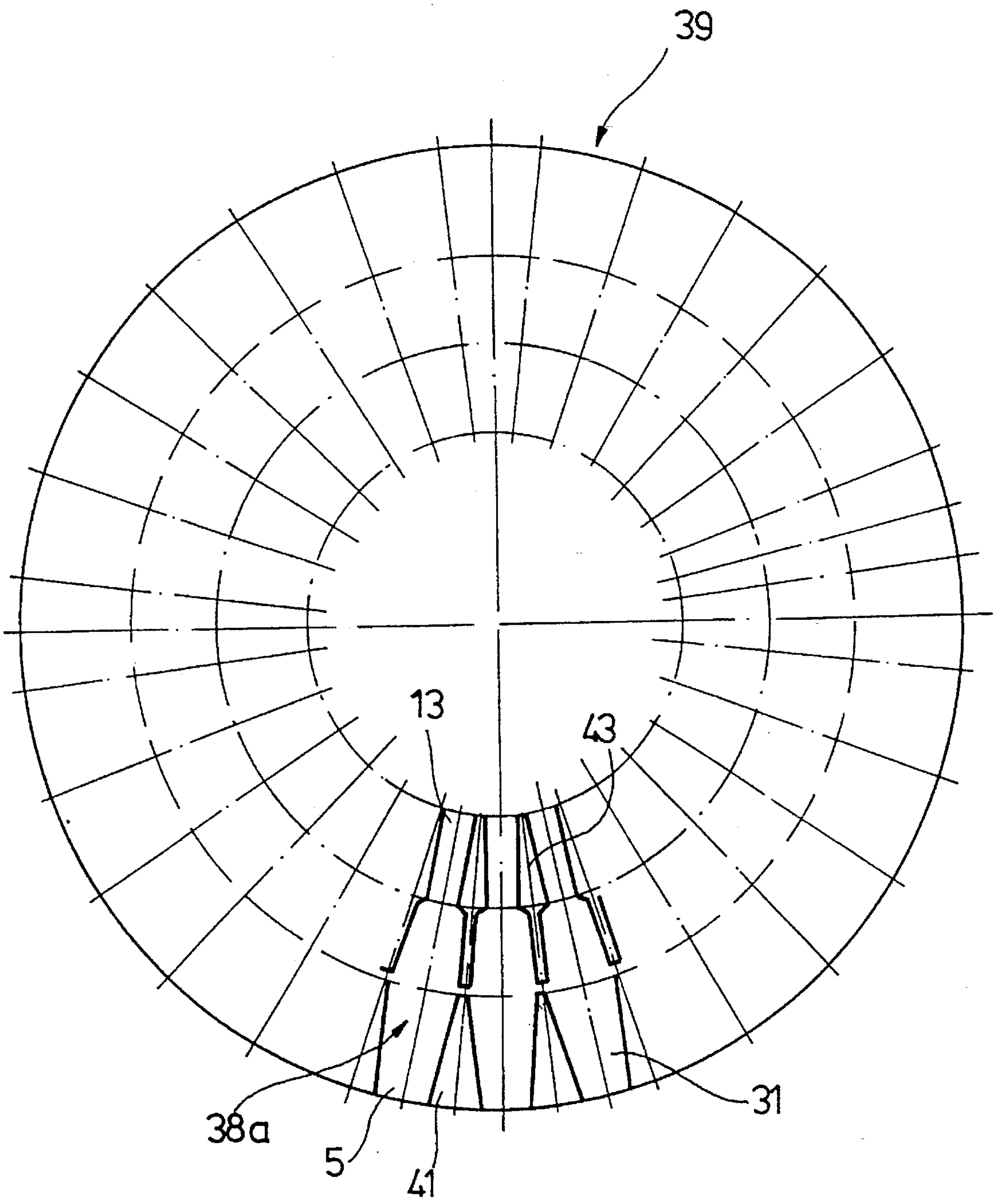
FIG. 2 shows a rough outline of an end side of a roll commutator seen from the top.

In a following processing step, the individual line portions 38 which are shown in a highly abbreviated manner in FIG. 1 are bent to form a circular ring after the fifth step, resulting in the top view of the end side of a bar ring 38*a* of a roll commutator 39 shown in very rough outline in FIG. 2. The individual line portions 38 of the metal section 1 indicated in FIG. 1 are bent in such a way that the anchoring claws 13 and 15 contact the inner side of the cylindrical roll commutator and the underside of the bars 31 shown in FIG. 1 forms its outer side.

FIG. 2 shows that the intermediate space 41 between the shorter arms 5 is widened by rolling the bars 31 shown in FIG. 1, while the intermediate space 43 located between the adjacent anchoring claws 13 and 15 is made more narrow.

Armor rings 45 and 47 can now be inserted in the end sides of the roll commutator 39 indicated in FIG. 2. The diameter of the armor rings 45 and 47 is selected in such a way that they contact between the anchoring claws 13 and 15 and the base body 3 of the metal section 1. A sleeve 49 serving as a seat for the finished roll commutator 39 on the shaft of an electric motor can be inserted in the interior of the roll commutator at a distance allowing for insulation.

Figure 3:
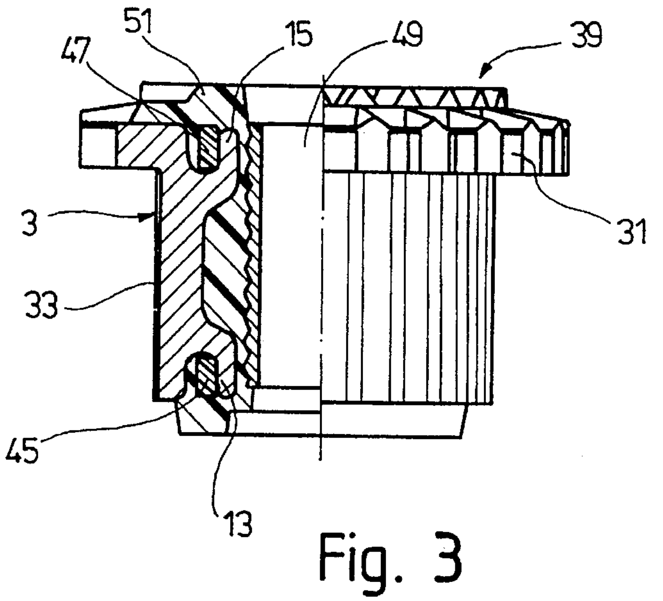
FIG. 3 shows a side view of a finished roll commutator in partial section.

As can be seen from the cross section of the commutator 39 shown in FIG. 3, the roll commutator 39, armor rings 45 and 47, and sleeve 49 are injected with plastic 51 in a next processing step. The sleeve 49 may be provided with projections and depressions on its outside for improved support.

In another work step, the outside of the roll commutator is turned or ground and the connecting cross-pieces 33 between the individual bars 31 are removed. The individual bars 31 are then held together only by the armor rings 45 and 47 and by the plastic mass 51. It should be noted that the anchoring claws 13 and 15 provide the bars with a secure support in the plastic 51. Further, the bars 31 and sleeve 49 are insulated from one another by the plastic 51.

It follows from the preceding that the manufacture of the roll commutator is relatively simple. In particular, no separate machining steps are required for manufacturing the anchoring claws 13 and 15, as can be seen particularly in FIG. 1. It is essential that the anchoring claws are already in their final form after the segments 19 and 23 are cut out in the first and second steps of the machining process. An additional bending or rough-turning process is not required for this, as has already mentioned above in relation to the background art.

Figure 4:
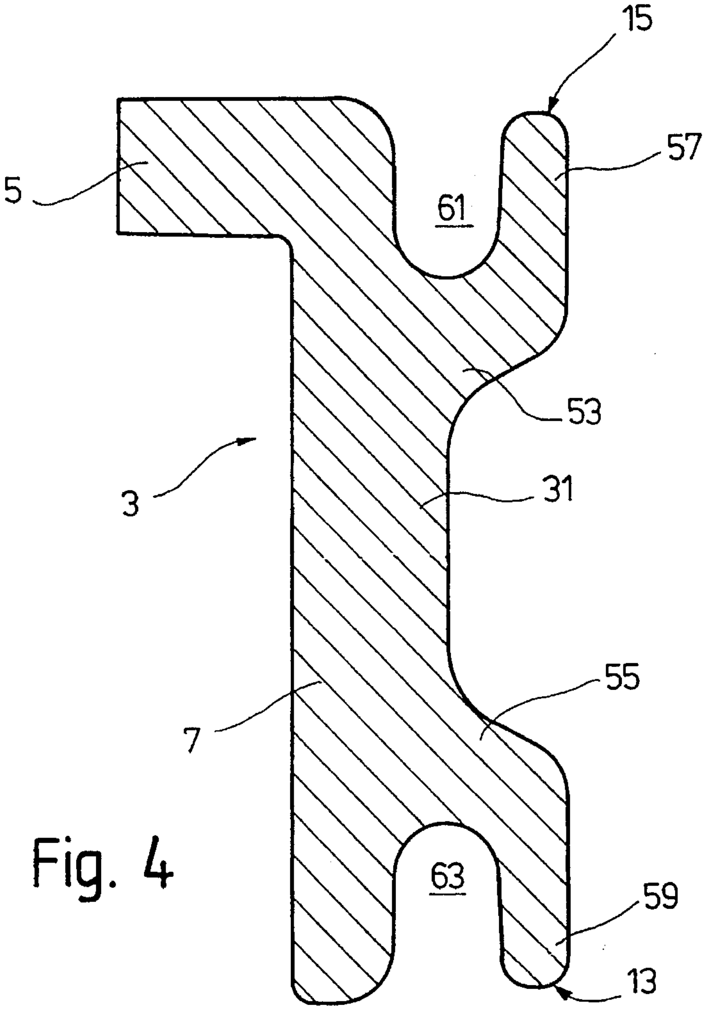
FIG. 4 shows an enlarged cross section through an individual bar of the roll commutator.

The enlarged sectional view shown in FIG. 4 through a bar 31 along its center plane shows the base body 3 with the longer arm 7 and with the shorter arm 5 which extends at approximately 90° relative to the latter.

The anchoring claws 15 and 13 proceed from the side of the longer arm 7 located opposite the shorter arm 5. It can be seen that they have a practically V-shaped root region 53 and 55 in the form of projections in their region of origin in the vicinity of the base body 3. These V-shaped root regions 53 and 55 are adjoined by the ends 57 and 59 of the anchoring claws extending outward in opposite directions parallel to the longer arm 7. The length of the ends 57 and 59 is selected in such a way that they practically cover the entire remaining length of the longer arm 7 proceeding from the root region 53 and 55. In this way, an intermediate space 61 or 63, respectively, which can serve to receive an armor ring (see reference numbers 45 and 47 in FIG. 3) is formed between the base body 3 and its longer arm 7, respectively, and the ends 57 and 59 of the anchoring claws 13 and 15. In every case, plastic mass enters this intermediate space 61 and 63, respectively, when injecting the roll commutator 39. This plastic mass is then held securely by the ends 57 and 59 of the anchoring claws 13 and 15, which can also be seen from the partial section according to FIG. 3.

The ends 57 and 59 are thinner than their respective root regions 53 and 55 and the base body 3. The roll commutator is accordingly relatively light while simultaneously ensuring a secure anchoring of the bars in the plastic mass 51.

From the preceding, it follows that the anchoring claws 13 and 15 can also be arranged oppositely so that the root regions 53 and 57 do not extend outward away from one another, but rather are directed toward one another. The ends of the anchoring claws are then also directed toward one another. It is not possible in such an arrangement of the anchoring claws to attach armor rings, although this is not a disadvantage in lighter embodiment forms. In such a construction of the anchoring claws, the projections 9 and 11 of the metal section 1 are constructed in a corresponding manner.

We claim:

1. A continuous element for manufacturing a roll commutator for electric motors, with a plurality of bars adjacent to one another annularly, the continuous element comprising a continuous metal section having one side which is provided with projections before production of the bars, said projections being formed so that they serve as anchoring claims after rolling up of the metal section and at least two said anchoring claws are provided on each of said bars, said metal section having a substantially L-shaped base body with a shorter arm and a longer arm, said projections being formed continuously at a side of said longer arm which is opposite to said shorter arm, said projections having ends which project outwardly in opposite directions from one another parallel to said longer arm.

2. A continuous element defined in claim 1, wherein said projections have a V-shaped root region.

3. A continuous element defined in claim 1, wherein said projections have a root region, said ends of said projections being thinner than said root region.

4. A continuous element for manufacturing a roll commutator for electric motors, with a plurality of bars adjacent to one another annularly, the continuous element comprising a continuous metal section from which the bars are produced, said continuous metal section having one side which is provided with projections before production of the bars, said projections being formed so that they serve as anchoring claws after rolling up of the metal section and at least two said anchoring claws are provided on each of said bars, said metal section having a substantially L-shaped base body with a shorter arm and a longer arm, said projections being formed continuously at a side of said longer arm which is opposite to said shorter arm, said projections having ends which project outwardly in opposite directions from one another parallel to said longer arm, said longer arm in a region between said anchoring claws being thicker than in end regions.

5. A method of manufacturing a roll commutator having a plurality of bars arranged adjacent to one another annularly, the method comprising the steps of providing a continuous metal section having a substantially L-shaped body with a shorter arm and a longer arm and forming projections on one of sides of the continuous metal sections; producing bars with projections serving as anchoring claws after rolling up the metal section and at least two said anchoring claws on each of said bars; arranging the projections so that the projections are formed continuously on a side of the longer arm which is opposite to the shorter arm; and projecting of the projections outwardly in opposite directions from another parallel to the longer arm.

6. A method defined in claim 5, wherein said producing includes first stamping in the anchoring claws out of the projections by cutting out segments, then shaping the bars from a longer arm of the metal section by cutting out additional segments in a longitudinal direction between the bars, subsequently separating the bars from one another by stamping dies acting in opposite directions until narrow cross-pieces remain at an outside of the bars, then removing the cross-pieces in a region of the shorter arm of the metal section of the cutting tool, and finally rolling the bars to form a ring bar in aligned portions separated from the metal sections, injecting with plastic anchored therein.

7. A method of manufacturing a roll commutator having a plurality of bars arranged adjacent to one another annularly, the method comprising the steps of providing continuous metal section having a substantially L-shaped body with a shorter arm and a longer arm and forming projections on one side of the continuous metal sections before production of the bars; producing the bars with projections serving as anchoring claws after rolling up the machined metal section and with at least two said anchoring claws on each of said bars; arranging the projections so that the projections are formed continuously on a side of the longer arm which is opposite to the shorter arm; projecting ends of the projections outwardly in opposite directions from one another parallel to the longer arm; and making the longer arm in a region between the anchoring claws thicker than in end regions.

* * * * *